(12) United States Patent
Walden et al.

(10) Patent No.: US 8,646,952 B2
(45) Date of Patent: Feb. 11, 2014

(54) RIDE-ON MOWER HAVING HEADLIGHT

(75) Inventors: Robert Walden, Gainesville, GA (US); Andrew Thornton, Winder, GA (US)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 13/541,950

(22) Filed: Jul. 5, 2012

(65) Prior Publication Data
US 2014/0007551 A1  Jan. 9, 2014

(51) Int. Cl.
*B60Q 1/00* (2006.01)
*B60Q 3/00* (2006.01)

(52) U.S. Cl.
USPC ........................................................ 362/485

(58) Field of Classification Search
USPC ......... 362/485, 516, 546, 499, 487, 106, 545, 362/547; 180/69.2, 68.1, 69.24; D15/15, D15/31, 23; D26/139, 28; 56/14.7; 257/99
See application file for complete search history.

(56) References Cited

U.S. PATENT DOCUMENTS

| | | | |
|---|---|---|---|
| 5,782,312 A * | 7/1998 | Murakawa | 180/69.2 |
| 6,082,477 A * | 7/2000 | Murakawa | 180/69.21 |
| 6,190,030 B1 * | 2/2001 | Chase | 362/549 |
| 6,447,152 B1 | 9/2002 | Goebert | |
| D482,148 S * | 11/2003 | Arthur et al. | D26/28 |
| 6,684,616 B2 * | 2/2004 | Hornung | 56/16.7 |
| 6,821,006 B2 * | 11/2004 | Shikiya | 362/496 |
| 6,857,253 B2 * | 2/2005 | Reimers et al. | 56/10.6 |
| D509,923 S * | 9/2005 | Arthur et al. | D26/139 |
| 7,021,803 B2 * | 4/2006 | Wong et al. | 362/507 |
| D546,351 S * | 7/2007 | Arthur et al. | D15/31 |
| 7,493,711 B2 * | 2/2009 | Gautreau et al. | 37/249 |
| 7,875,897 B2 * | 1/2011 | Suehiro | 257/99 |
| D655,316 S | 3/2012 | Moriguchi et al. | |
| 2003/0024223 A1 * | 2/2003 | Jager et al. | 56/7 |
| 2004/0202007 A1 * | 10/2004 | Yagi et al. | 362/545 |
| 2007/0204581 A1 * | 9/2007 | Reimers et al. | 56/7 |
| 2012/0113633 A1 * | 5/2012 | Bowen | 362/235 |
| 2012/0320613 A1 * | 12/2012 | Singhal | 362/487 |

FOREIGN PATENT DOCUMENTS

| | | | | |
|---|---|---|---|---|
| CN | 201555045 U | * | 8/2010 | F21S 2/00 |
| DE | 202010017453 U1 | * | 1/2012 | B60Q 1/26 |

OTHER PUBLICATIONS

Mower Direct via WayBackMachine.org, Toro 117-5317 Titan Zero Turn Lawn Mower Light Kit, Date Jun. 2010.*
Mower Direct via WayBackMachine.org, Simplicity 5900821 Citation (61") 28HP Zero Turn Mower, Date Apr. 2011.*
Mower Direct via WayBackMachine.org, Ariens 715063 Zoom Zero Turn Lawn Mower Headlight Kit, Date Jun. 2009.*
Mower Direct via WayBackMachine.org, Simplicity 5049604 / Snapper Light Kit for Zero Turn Mower, Date Jun. 2011.*
Snapper NXT2652 (52") 26HP NXT Lawn Tractor (2012 Model), "Bright, 100,000 Hour Life LED Headlights", Dated Mar. 2012.*

* cited by examiner

*Primary Examiner* — Árpád Fábián-Kovács
(74) *Attorney, Agent, or Firm* — Greenblum & Bernstein, P.L.C.

(57) ABSTRACT

A ride-on mower with a mower unit attached to a frame unit includes a headlight housing extending in a transverse direction of the vehicle body over the width of the frame unit and fixed to the frame unit forwardly of a front end of the mower deck. A right and left pair of headlight units are housed in the headlight housing. Light passage portions are formed in opposite end portions of the headlight housing for directing light coming from each of the headlight unit to the side and/or to the rear toward a direction of the front end of the mower deck.

14 Claims, 9 Drawing Sheets

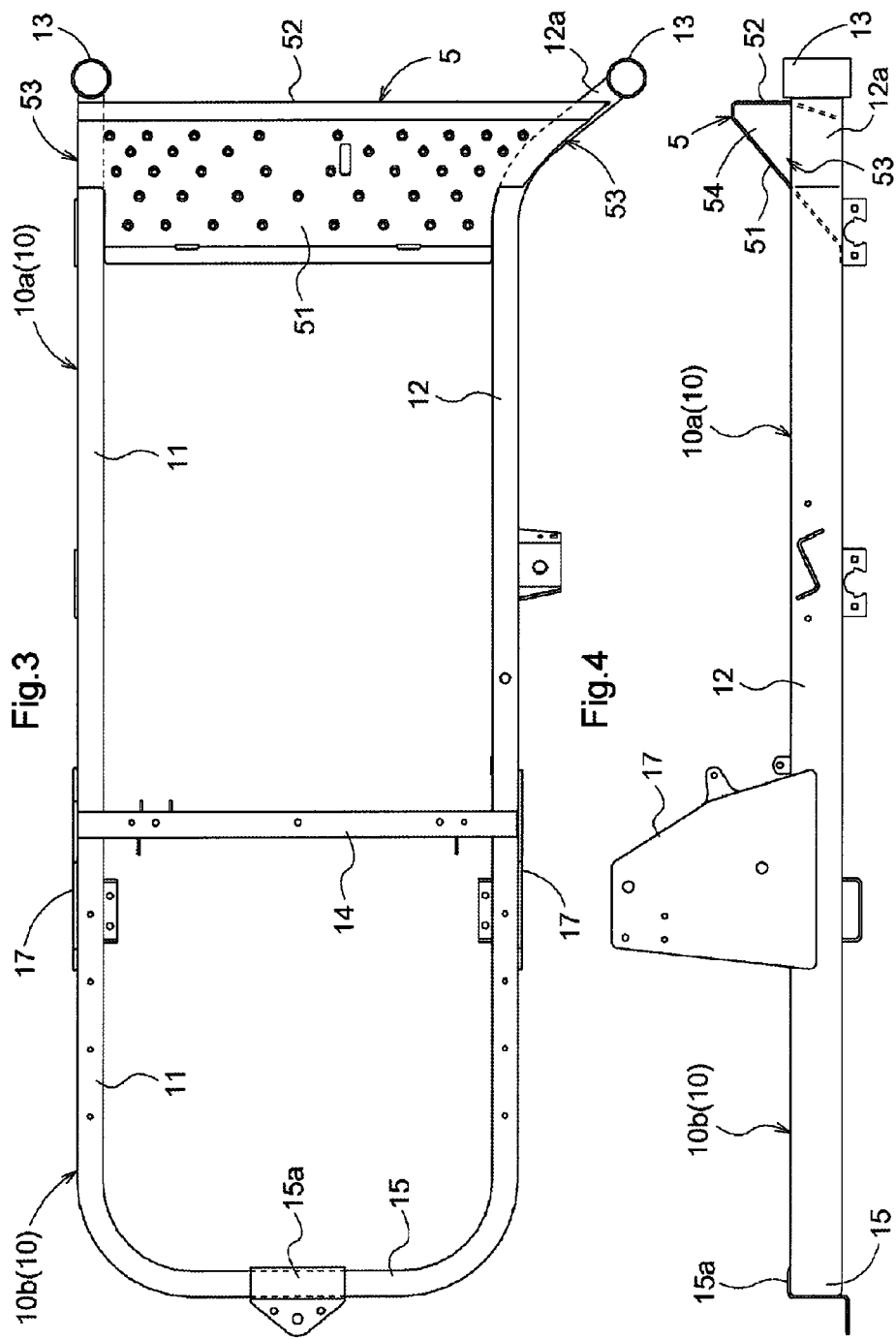

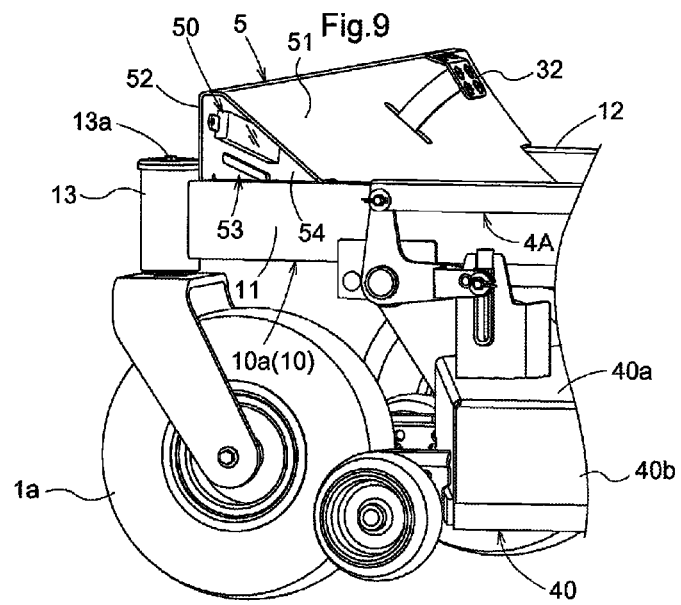
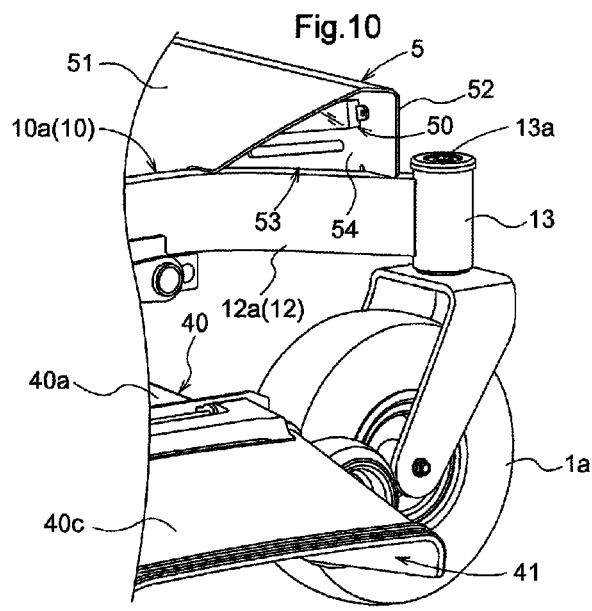

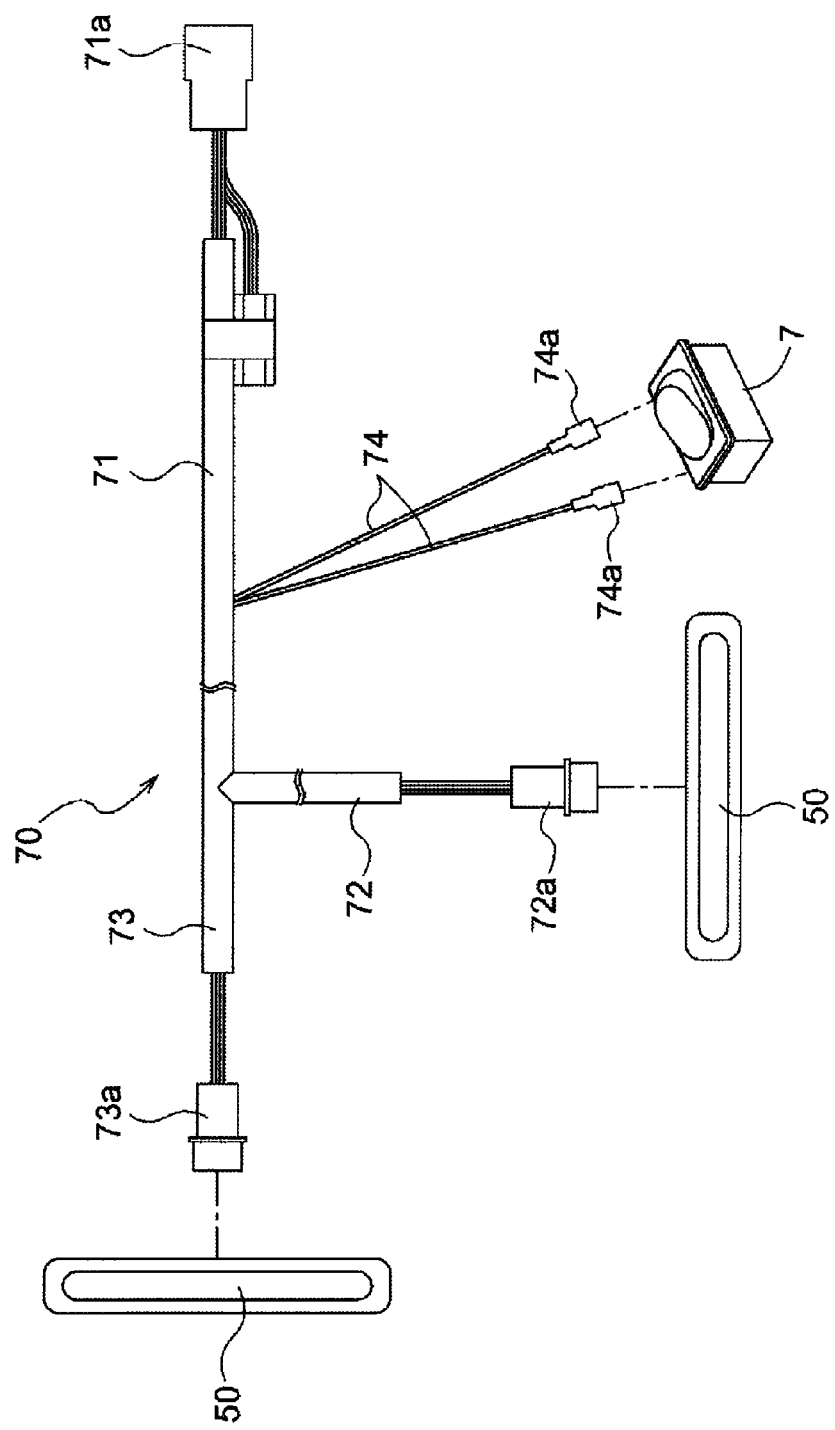

RIDE-ON MOWER HAVING HEADLIGHT

TECHNICAL FIELD

The present invention relates to a ride-on mower having a headlight.

BACKGROUND ART

A lawn mower according to U.S. Pat. No. 6,447,152 includes a headlight and sidelight assembly incorporated in a front portion of a hood. The headlight and sidelight assembly consists of a right sub-assembly and a left sub-assembly each having a light housing, a reflector, and a light bulb. In the right sub-assembly, the reflector and the light bulb are arranged so that an irradiation range has a wide angle of approximately 170 degrees with a light-emitting centerline being defined at an angle of approximately 45 degrees on the right forward side. Meanwhile, in the left sub-assembly, the reflector and the light bulb are arranged so that an irradiation range has a wide angle of approximately 170 degrees with a light-emitting centerline being defined at an angle of approximately 45 degrees on the left forward side. As a result, the headlight and sidelight assembly including the right and left sub-assemblies has an irradiation range of an angle of approximately 270 degrees including the entire area of the forward side and part of the rear side of the headlight and sidelight assembly. However, the headlight and sidelight assembly is arranged in a region around an upper end of a front grille mounted on a frame supported by front wheels, and thus a lower portion of the vehicle body (a region close to the ground) is not considered as a substantial irradiation range. As a result, a region between the front wheels and a mower unit positioned rearwardly of the front wheels is not irradiated satisfactorily. This causes a disadvantage that conditions of lawn grass just before being mown are hardly visible in mowing operation in the dim light.

A ride-on mower according U.S. Design Pat. No. 655,316 includes elements like headlights disposed in a relatively low position in a front end portion of a vehicle body positioned forwardly of front wheels. Even if such elements are the headlights, no consideration is given to irradiating a region rearwardly of those headlights. In other words, the region between the front wheels positioned rearwardly of those elements and a mower unit positioned farther rearwardly of the front wheels that is about to undergo mowing operation cannot enjoy the benefit of the lighting from those elements, even if the elements are the headlights.

In view of the above-noted situation, there has been a demand for a ride-on mower for properly irradiating a region between front wheels and a mower unit as well.

SUMMARY OF INVENTION

A ride-on mower according to the present invention comprises front wheels and rear wheels; a frame unit extending in a longitudinal direction of a vehicle body and supported to the ground through the front wheels and rear wheels; a mower unit attached to the frame unit to be vertically movable; a headlight housing; and a right and left pair of headlight units housed in the headlight housing. The mower unit includes a mower deck covering at least one blade from above. The headlight housing extends in a transverse direction of the vehicle body over the width of the frame unit and fixed to the frame unit and, preferably, forwardly of a front end of the mower deck. In addition, light passage portions are formed in opposite end portions of the headlight housing for directing light coming from each of the headlight unit to the side and/or to the rear toward a direction of the front end of the mower deck.

With the above-described arrangement, the light coming from the headlight units through the light passage portions irradiates the front end of the mower deck. As a result, the region to be mown positioned between the front wheels and the mower unit is easily visible even in the dim light. In such a situation, the front end of the mower deck can be illuminated more satisfactorily if the headlight housing is positioned rearwardly of a front end of the front wheels.

In a specifically preferable embodiment, the headlight housing acts as a light guide member for guiding leaking light coming from the headlight units to the light passage portions. With such an arrangement, the leaking light can be effectively used for irradiating the rear region of the headlight units. One of simple arrangements of the light guide member can be achieved by providing a profile member extending in the transverse direction of the vehicle body and including an interior space closed at least partially from the outside in an upper side, forward side and rearward side. The profile member referred to in this description represents a structure with a bottom being opened having a peaked roof or a dome, or a cylindrical member having a rectangular or circular section. More particularly, the leaking light is guided to the light passage portions through reflection of inner wall surfaces of the profile member.

In addition, the above-noted headlight housing has high rigidity, and thus may be used as a cross beam to additionally increase the strength of a front part of the vehicle body.

BRIEF DESCRIPTION OF DRAWINGS

FIG. 3 is a top plan view of a frame unit;

FIG. 4 is a side of the frame unit;

FIG. 9 is a perspective view of the headlight housing seen diagonally from the left rear;

FIG. 10 is a perspective view of the headlight housing seen diagonally from the right rear;

FIG. 13 is a top plan view of the electric supply cable assembly; and

DESCRIPTION OF EMBODIMENTS

Figure 1:
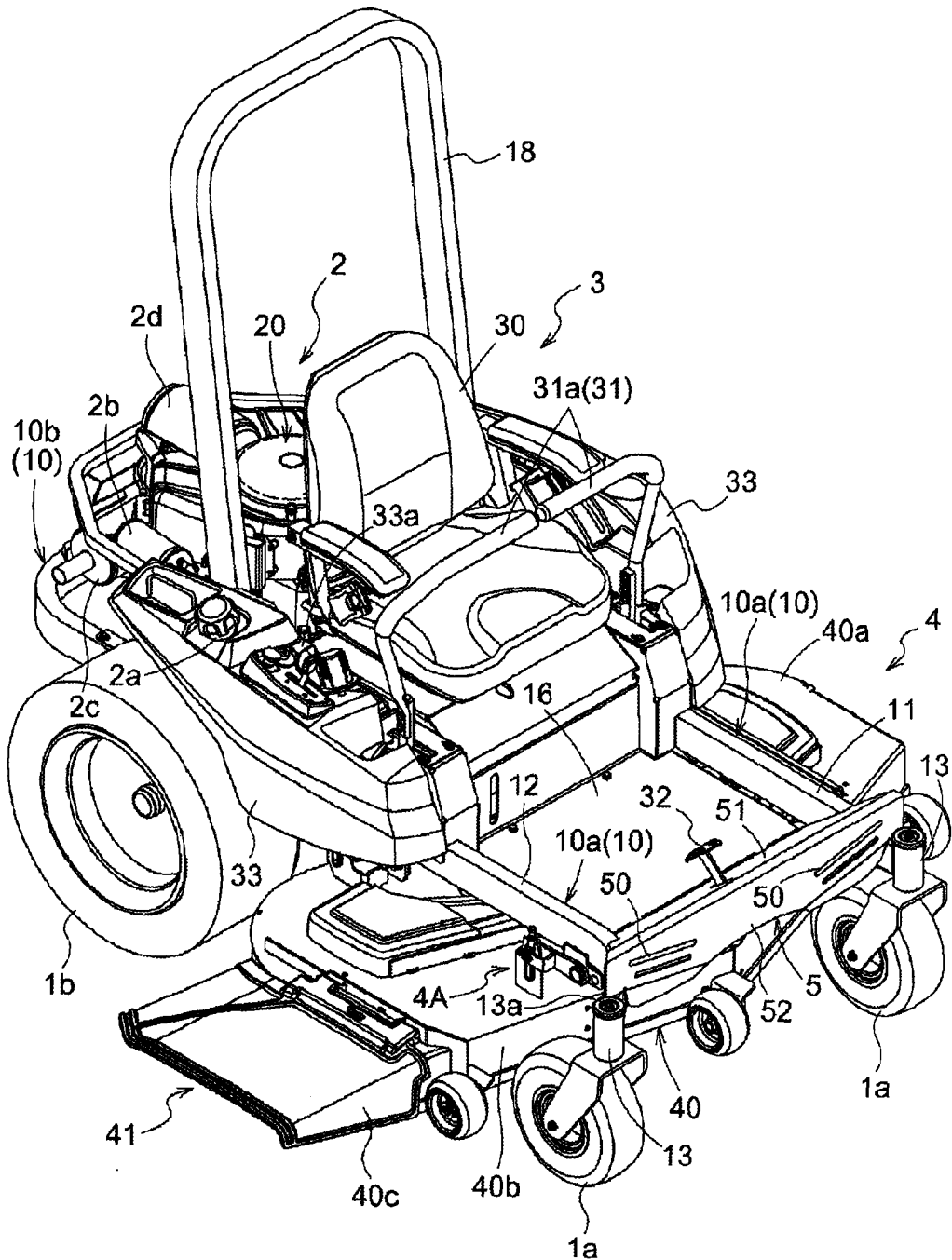
FIG. 1 is a perspective view of a zero-radius-turning mower as an example of a ride-on mower according to the present invention.
Figure 2:
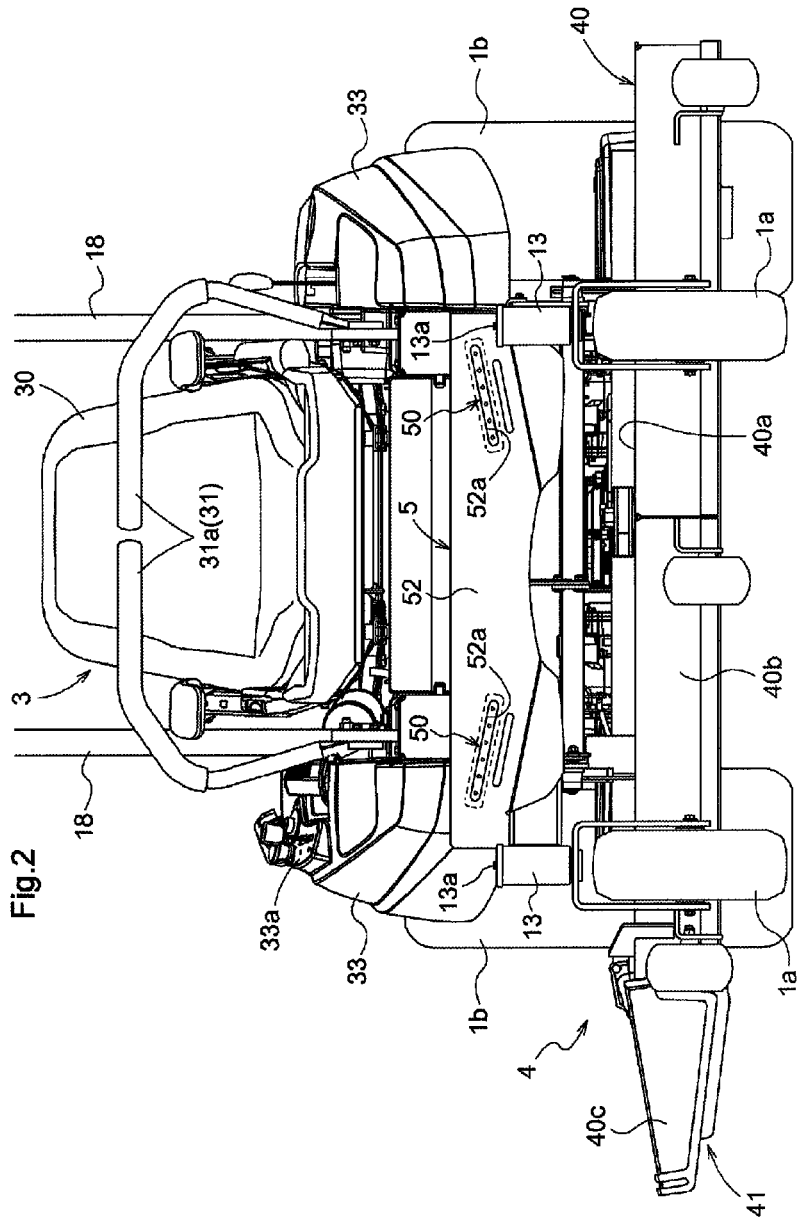
FIG. 2 is a front view of the zero-radius-turning mower.

FIG. 1 is a perspective view of a zero-radius-turning mower as an example of a ride-on mower according to the present invention. FIG. 2 is a front view of a mower unit 4. This zero-radius-turning mower is a mid-mount mower, in which the mower unit 4 is arranged under a vehicle body between a right and left pair of front wheels 1a and a right and left pair of rear wheels 1b. The zero-radius-turning mower has a front exterior substantially formed by a headlight housing 5 with a right and left pair of headlight units 50 attached thereto and extending in a transverse direction of the vehicle body.

The vehicle body is formed of a frame unit 10 including a left frame 11 and a right frame 12 representing longitudinal frames made of square pipes. The frame unit 10 is supported to the ground through the front wheels 1a each having a smaller diameter and formed as a caster wheel and the rear wheels 1b each having a larger diameter and formed as a drive wheel in the illustrated example. The mower unit 4 is supported to the frame unit 10 to be vertically movable through a raising/lowering mechanism 4A. A driver's section 3 is mounted on a front frame 10a forming a front half of the frame unit 10, while a drive unit 2 including an engine 20 is mounted on a rear frame 10b forming a rear half of the frame unit 10. In the current description, the term "front" means the forward side and the term "rear" means the rearward side in the traveling direction of the vehicle body unless any specific definition is given.

As shown in FIGS. 3 and 4, the frame unit 10 includes the left longitudinal frame 11 and right longitudinal frame 12, a rear cross beam 15 for connecting those frames at rear ends thereof, and an intermediate cross beam 14 as main components. In the current embodiment, the left longitudinal frame 11 is integrally formed with a left half of the rear cross beam 15, while the right longitudinal frame 12 is integrally formed with a right half of the rear cross beam 15. The left half of the rear cross beam 15 and the right half of the rear cross beam 15 are connected to each other through a connecting member 15a. A bracket 17 is attached to an outer surface of each of the right longitudinal frame 12 and the left longitudinal frame 11 connected to each other through the intermediate cross beam 14 for supporting components of a driver's seat 30.

The left longitudinal frame 11 extends linearly, while the right longitudinal frame 12 has a forward region bent outward that forms a projecting portion 12a such that a gap between the left longitudinal frame 11 and the right longitudinal frame 12 in the transverse direction of the vehicle body is increased toward the front. A caster bearing portion 13 is provided in each of extreme ends of the left longitudinal frame 11 and the right longitudinal frame 12 for rotatably supporting a vertical steering shaft 13a of each front wheel 1a.

The headlight housing 5 is mounted between a front portion of the left longitudinal frame 11 and a front portion, that is, the projecting portion 12a, of the right longitudinal frame 12. The headlight housing 5 also acts as a cross bar for connecting the front portion of the left longitudinal frame 11 to the front portion, that is, the projecting portion 12a of the right longitudinal frame 12. The headlight housing 5 has a front plate 52 substantially formed as a vertical plate, and a rear plate 51 formed as a slanting plate having a slanting surface inclined upward and forward. The front plate 52 and the slanting plate (rear plate) 51 are connected to each other at upper edges thereof, which forms the headlight housing 5 including a groove-shaped structure (a kind of profile members) with an interior space having a triangle section substantially opened downward. The front plate 52 and the slanting plate 51 may be separate members that are connected to each other by welding or may be a one-piece member provided by bending machining. Opposite ends of the front plate 52 and of the slanting plate 51 contact inner side walls and upper walls of the left longitudinal frame 11 and the right longitudinal frame 12, respectively, to be welded. The slanting plate 51 is also used as a footrest of the operator seated in the driver's seat that has a nonslip surface provided by bore-machining to have a number of projections on the surface side. In addition, a vertical slot is formed in a substantially central portion of the slanting plate 51, through which an arm of a mower elevation control pedal 32 extends upward.

As apparent from FIG. 1, a floor 16 (step) made of sheet metal is provided between the right and left longitudinal frames 11 and 12 to continue from the slanting plate 51. The driver's seat 30 is mounted rearwardly of the floor 16. Fenders 33 are provided in opposite sides of the driver's seat 3. A control panel 33a including various control levers and control switches is provided on a top surface of the fender 33.

The mower unit 4 is a blade type having at least one blade (three blades in the illustrated example). Since the blades are covered by a mower deck 40, and thus not visible in FIG. 1 or 2. The mower deck 40 includes a top wall 40a and a side wall 40b having a partially opened portion. A side discharge cover 40c shaped as an extension of the opened portion and the surrounding top wall 40a and side wall 40b produces a clippings discharge opening 41 for discharging grass clippings to the side. The side discharge cover 40c forms a projecting portion of the mower deck 40 protruding to the side to a great extent from the frame unit 10 in the transverse direction of the vehicle body.

As shown in FIG. 1, the engine 20 forming the drive unit 2 for supplying drive power to the rear wheels 1b acting as the drive wheels is provided in the rear frame 10b of the frame unit 10. The engine 20 is mounted with its output shaft projecting downward. A fuel tank 2a is mounted over a front side area to a right side area of the engine 20. The fuel tank 2a consists of a main tank portion arranged forwardly of the engine 20 under the driver's seat 30 and an auxiliary tank portion arranged rearwardly of the driver's seat 30 and extending upright in the right side of the engine 20. An oil-supply unit is attached to a top portion of the auxiliary tank portion of the fuel tank 2a. A canister 2b is arranged adjacent to the rear side of the auxiliary tank portion of the fuel tank 2a. A muffler 2c is provided rearwardly of the engine 20. Further, an air cleaner 2d is provided at a level higher than the engine 20.

Figure 5:
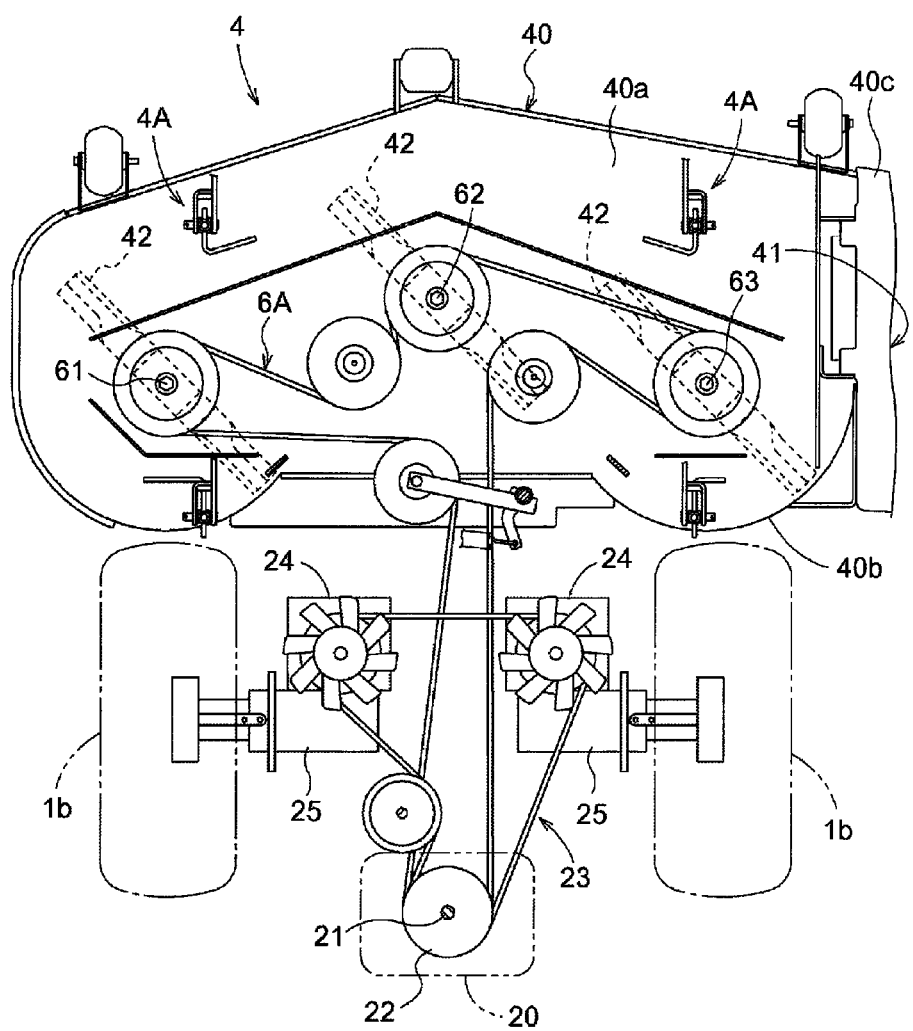
FIG. 5 is a schematic view showing a power transmission line in a wheel drive power transmission mechanism and a blade drive power transmission mechanism.

As shown in FIG. 5, an HST (hydrostatic transmission) 24 that is an example of a stepless speed-change device for transmitting drive power to the rear wheels 1b and an axle transmission mechanism 25 are provided to correspond to each of the right and left rear wheels 1b. Belt pulley 22 are provided in the output shaft 21 of the engine 20 and the HSTs 24 to form a first belt transmission mechanism 23 acting as a wheel drive power transmission mechanism, in which rotational output of the engine 20 is transmitted to the HSTs 24. Each HST has a speed-change control shaft (not shown) that is linked to a right and left pair of shift control levers 31a forming a steering unit 31 provided forwardly of the driver's seat 30 through a control link mechanism so as to be controlled in response to oscillating operations of the shift control levers 31a in the longitudinal direction.

With the above-noted arrangement, the right and left shift control levers 31a are oscillated in the longitudinal direction to control the HST 24 corresponding to each of the shift control levers 31a for speed change, thereby to speed-change the right and left rear wheels 1b independently. More particularly, in this type of ride-on lawn mower, the right and left front wheels 1a are followably steered while the right and left rear wheels 1b are independently driven for speed change, thereby to desirably produce a stop state for stopping the right and left rear wheels 1b, a straight-forward traveling state for driving the right and left rear wheels 1b forwardly or reversely at the same speed, a gentle-turn state for driving the right and left wheels 1b forwardly or reversely at different speeds, a pivot-turn state for stopping one of the right and left rear wheels 1b while driving the other of them forwardly or reversely, and a spin-turn state for driving one of the right and left rear wheels 1b forwardly while driving the other of them reversely.

As depicted in broken line in FIG. 5, three cutting blades 42 are arranged side by side in the transverse direction of the vehicle body within the mower deck 41. The blades 42 are fixed to three blade shafts each having a vertical rotary axis supported to the mower deck 41, respectively, that is, a first blade shaft 61, second blade shaft 62 and third blade shaft 63. The first blade shaft 61, second blade shaft 62 and third blade shaft 63 extend upward through the top wall 40a. A second belt transmission mechanism 6A acting as a blade drive power transmission mechanism is provided between the output shaft 21 of the engine 20, first blade shaft 61, second blade shaft 62 and third blade shaft 63, and a belt pulley is mounted on each of the shafts. This allows the rotational output of the engine 20 to be transmitted to the mower unit 4 for rotating the blades 42. While not being visible in the drawings, the first belt transmission mechanism 23 for driving the wheels and the second belt transmission mechanism 6A for driving the blades use the output shaft 21 of the engine 20 as an input shaft, and arranged at different levels independently of each other planarly. More particularly, two belt pulleys 22 are fixed to the output shaft 21 of the engine 20.

Figure 6:
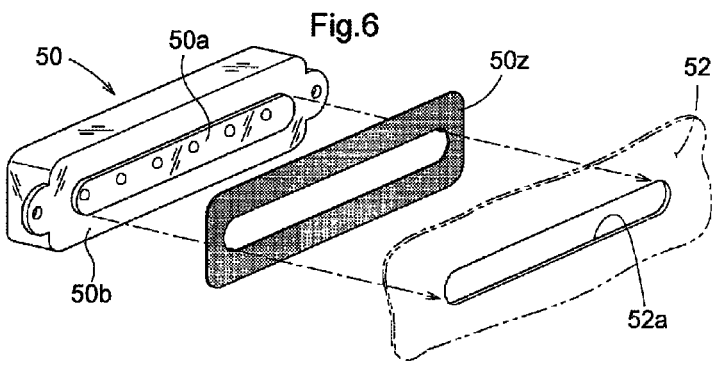
FIG. 6 is an exploded perspective view of a headlight unit.

A horizontally elongated through bore 52a is formed in each of a left area and a right area of the front plate 52 of the headlight housing 5. The headlight unit 50 shown in FIG. 6 is arranged in the interior space 54 of the headlight housing 5 to align with the position of the through bore 52a. The headlight unit 50 has an LED array 50a with LED elements arranged in a row, and an LED holder 50b holding the LED array 50a. Screw flanges are formed in opposite sides of the LED holder 50b. The headlight unit 50 is attached to the front plate 52 through a double-faced adhesive sheet 50z to allow the LED array 50a to be visible from the through bore 52a. The attachment of the front plate 52 to the headlight unit 50 may be achieved by screw fixation using the screw flanges of the LED holder 50b, or adhesive fixation using the double-faced adhesive sheet 50z, or both.

Figure 7:
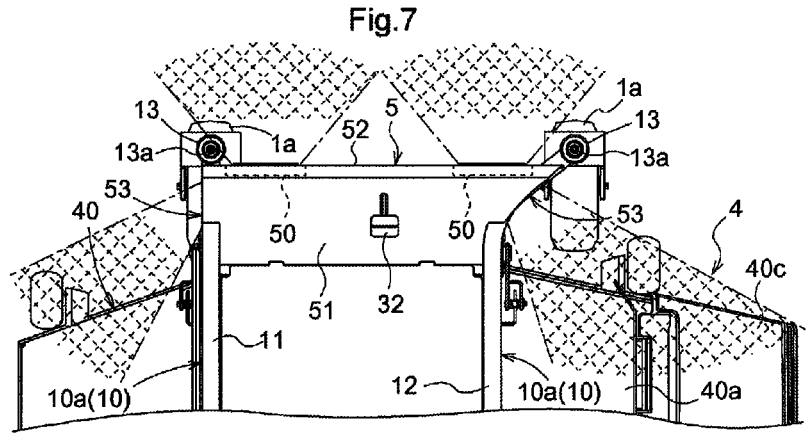
FIG. 7 is a top plan view showing regions irradiated by the headlight units.
Figure 8:
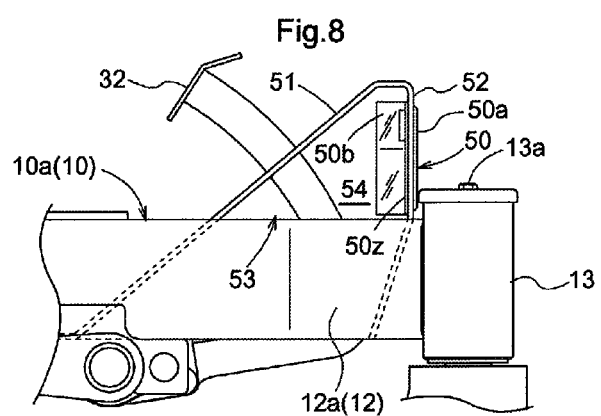
FIG. 8 is a side view of a headlight housing.

The LED array 50a is adapted to emit intensive light in an irradiation direction directed to the front, and also emit light to the sides of the irradiation direction. In the current description, light coming from the LED array 50a emitted to a direction other than the irradiation direction is termed leaking light. In order to increase an amount of the leaking light, it may be effective to provide translucency to the LED holder 50b, provide dispersiveness to lenses of the LED array 50a, or provide a reflector to the LED array 50a, for example. In any case, the LED array 50a not only emits the major light forwardly but also emits the leaking light laterally and rearwardly. In the present invention, the headlight housing 5 is provided with light passage portions at opposite ends thereof, through which the leaking light passes toward the front end of the mower deck 40, representing openings 53 delimited by the front plate 52, the slanting plate 51 and the right and left longitudinal frames 11 and 12 in the current embodiment. Further, as shown in FIGS. 8 to 10, since the right and left pair of headlight units 50 are covered by the headlight housing 5, the inner surfaces of the headlight housing 5 act as a light guide member for guiding the leaking light from the headlight units 50 toward the openings 53. Thus, the leaking light is emitted to the front end of the mower deck 40 through the openings 53 as shown in FIG. 7 to irradiate a region from the rear of the front wheels 1a to the mower deck 40.

As apparent from FIGS. 8 to 10, the headlight units 50 are mounted above the openings 53 at a level higher than the top surfaces of the right and left longitudinal frame 11 and 12, which allows the leaking light to pass through the openings 53 and to be emitted downward to irradiate the ground satisfactorily. In addition, the headlight units 50, resultingly the openings 53, are positioned rearwardly of the vertical steering shaft 13a of the front wheels 1a acting as the caster wheels, which allows the leaking light coming from the openings 53 to satisfactorily irradiate the region between the front wheels 1a and the mower deck 40 that is a main part for mowing operations.

Next, an electric power supply system for the headlight units 50 will be described hereinafter in reference to FIGS. 11 to 13.

The electric power supply system includes an electric supply cable assembly and a light switch.

Figure 11:
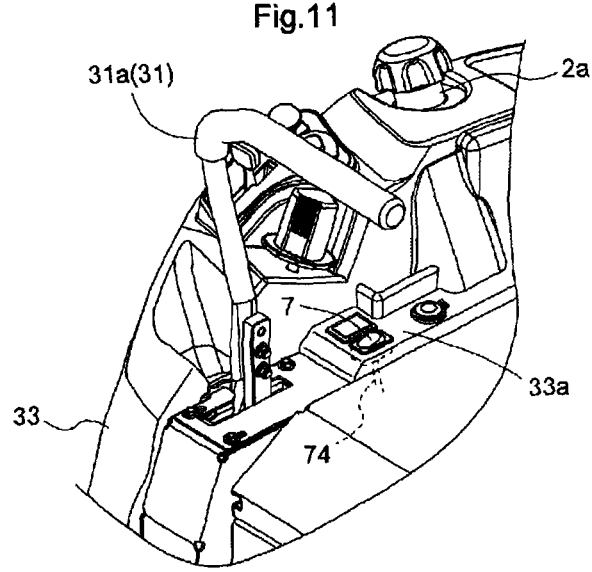
FIG. 11 is a perspective view showing a layout of a light switch.

As shown in FIG. 11, the light switch 7 for turning on or off the headlight units 50 is arranged on the control panel 33a mounted on the right side of the driver's seat 30. FIG. 13 shows the electric supply cable assembly 70 for supplying electric power to the right and left pair of headlight units 50. The electric supply cable assembly 70 includes a main cable 71, two branch cables 72 and 73 diverged from the main cable 71, and a switch cable 74. The main cable 71 has a connecting terminal 71a at one end thereof to be connected to a power supply panel connected to a battery, and is connected to the two branch cables 72 and 73 at the other end thereof. The branch cables 72 and 73 have connecting terminals 72a and 73a at free ends thereof to be connected to the right and left pair of headlight units 50, respectively. The switch cable 74 also has a connecting terminal 74a at a free end thereof to be connected to the light switch 7. While any detailed description will be omitted here, as the connecting terminals are connected to corresponding terminals, respectively, the headlight units 50 are turned on by a switch-on operation of the light switch 7, and are turned off by a switch-off operation of the light switch 7.

Figure 12:
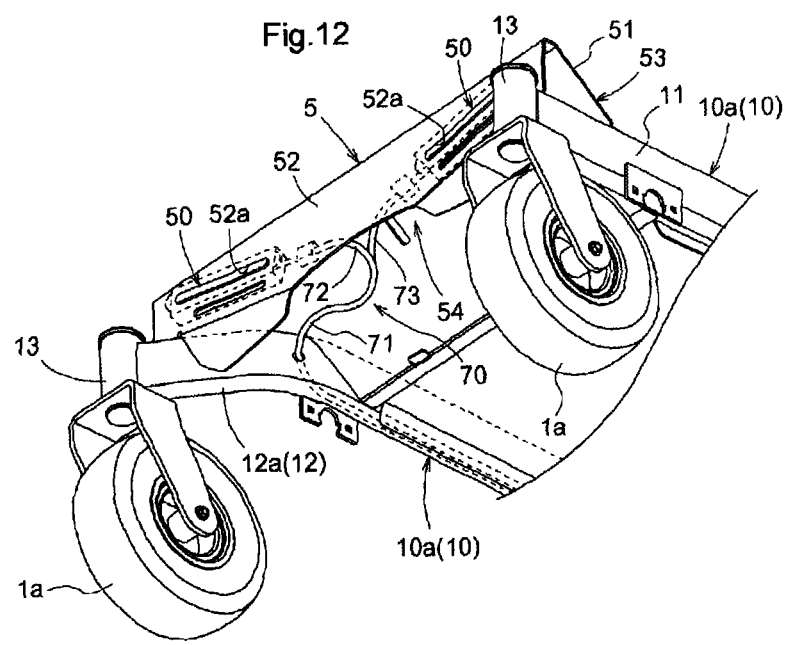
FIG. 12 is a perspective view showing a wiring layout of an electric supply cable assembly.
Figure 14A:
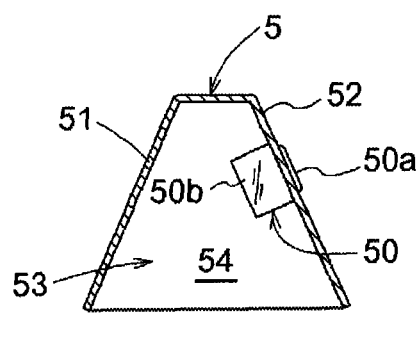
FIGS. 14A to 14D are schematic views showing variations of a section of the headlight housing.
Figure 14B:
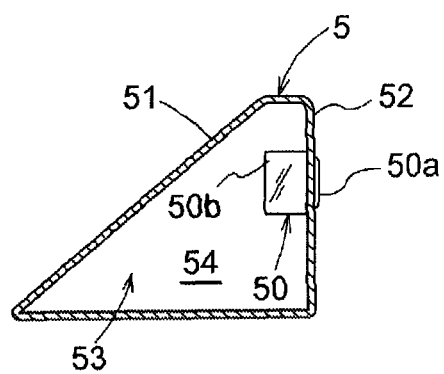
Figure 14C:
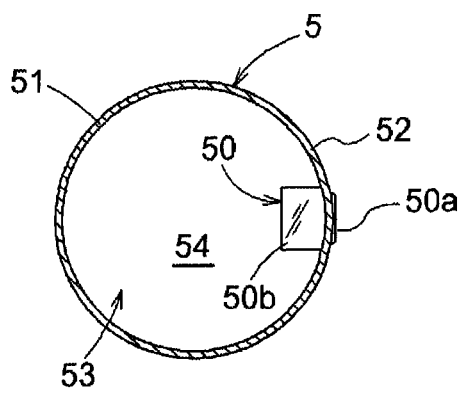
Figure 14D:
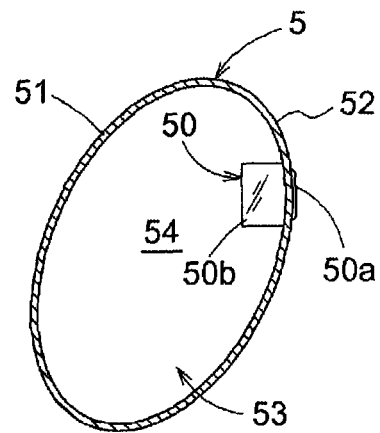

As understood from FIG. 12, most part of the main cable 71 is accommodated within one of the right and left longitudinal frames 11 and 12 made of square pipes (the right longitudinal frame 12 in the drawings). The switch cable 74 extends from the back side of the control panel 33a to the interior of the fender 33 and enters the right longitudinal frame 12 through a bore to be connected to the main cable 71. The main cable 71 extends through the interior of the right longitudinal frame 12, exits from the right longitudinal frame 12 through a bore before the projecting portion 12a, enters the interior space 54 of the headlight housing 5, and diverges into the right and left branch cables 72 and 73. Then, the branch cables 72 and 73 are connected to the headlight units 50, respectively.

Modified Embodiments

[1] In the above-described embodiment, the vertical section of the headlight housing 5 in the longitudinal direction of the vehicle body is generally triangle. Instead, various shapes such as a trapezoidal section or any other polygonal section as shown in FIG. 14 may be employed. Further, instead of the arrangement opened downward as in the above-described embodiment, the headlight housing 5 may be cylindrical and have various sections such as polygonal, circular and oblong sections, for example. In other words, it is more preferable that the headlight housing 5 is formed of what is called a profile member having any of various sections and provides reflecting properties to the inner surfaces thereof for guiding the light to the opposite sides.

[2] In the above-described embodiment, the light passage portions 53 are formed as the openings at the opposite ends of the headlight housing 5. Instead, each of the openings may be closed with a cap made of a translucent material to allow the cap to act as the light passage portion 53. Alternatively, lining may be applied to at least the inner surfaces of the headlight housing 5 with a translucent material to extend from the headlight units 50 to the opposite ends, thereby to allow outer ends of the lining to act as the light passage portions 53. Further, it is within the scope of the present invention to additionally provide a reflecting member to each of the light passage portions 53 for reflecting the leaking light on the front end region of the mower unit 4.

[3] In the above-described embodiment, the mower unit 4 of the blade type is provided in the ride-on mower. Instead, the present invention is applicable to the lawn mower provided with the mower unit 4 of any other type, e.g., of a reel type.

[4] In the above-described embodiment, the mid-mount zero-radius-turning mower is employed as the ride-on mower. Instead, the present invention is applicable to a mid-mount mower of a tractor type.

What is claimed is:

1. A ride-on mower comprising:
    front wheels and rear wheels;
    a frame unit extending in a longitudinal direction of a vehicle body and supported to the ground through the front wheels and rear wheels;
    a mower unit attached to the frame unit to be vertically movable and including at least one blade, and a mower deck covering the at least one blade from above;
    a headlight housing extending in a transverse direction of the vehicle body along the width of the frame unit and fixed to the frame unit forwardly of a front end of the mower deck;
    a right and left pair of headlight units housed in the headlight housing; and
    each headlight unit producing forward directed light and leaking light directed along a direction other than the forward directed light,
    wherein light passage portions are formed in opposite end portions of the headlight housing for directing leaking light coming from each of the headlight units at least one of to the side and rearwardly toward a direction of the front end of the mower deck,
    wherein the headlight housing acts as a light guide member for guiding leaking light coming from the headlight units to the light passage portions, and
    wherein the light passage portions are openings formed in the opposite end portions of the headlight housing.

2. The ride-on mower as defined in claim 1, wherein the headlight housing is positioned rearwardly of a front end of the front wheels.

3. The ride-on mower as defined in claim 1, wherein the headlight housing is a profile member extending in the transverse direction of the vehicle body and including an interior space closed at least partially from the outside in an upper side, forward side and rearward side.

4. The ride-on mower as defined in claim 3, wherein the frame unit includes a right and left pair of elongated frames extending in the longitudinal direction of the vehicle body, and the headlight housing is formed as a cross beam for connecting front ends of the right and left pair of elongated frames to each other.

5. The ride-on mower as defined in claim 1, wherein the headlight housing includes a slating plate inclining upward and forward, and a front plate positioned forwardly of the slating plate and connected to an upper end of the slanting plate, the slanting plate acts as a footrest for the operator, and the front plate has a through bore provided therein, through which light coming from each of the headlight units passes.

6. The ride-on mower as defined in claim 5, wherein the headlight units are attached to a back surface of the front plate at a level higher than the elongated frames, and each of the light passage portions is an opening delimited by the slanting plate, the front plate and the elongated frame.

7. The ride-on mower as defined in claim 5, wherein a floor plate is placed on a top surface of the frame unit to continue from a lower end of the slanting plate.

8. The ride-on mower as defined in claim 1, wherein the front wheels act as caster wheels, and the headlight housing is arranged rearwardly of a position where vertical steering shafts of the front wheels are attached to the frame unit.

9. The ride-on mower as defined in claim 1, wherein:
    the headlight housing includes a front plate having a through bore provided therein for each respective headlight unit,
    each respective headlight unit comprises an LED array and an LED holder,
    the LED array is structured and arranged so as to face a respective through bore, and
    the LED holder is translucent.

10. The ride-on mower as defined in claim 9, wherein a front surface of the LED holder contacts the front plate, and the leaking light is discharged from side surfaces of the translucent LED holder.

11. The ride-on mower as defined in claim 1, wherein a light passage extends the full width of the frame unit.

12. A ride-on mower comprising:
    front wheels and rear wheels;
    a frame unit extending in a longitudinal direction of a vehicle body and supported to the ground through the front wheels and rear wheels;
    a mower unit attached to the frame unit to be vertically movable and including at least one blade, and a mower deck covering the at least one blade from above;
    a headlight housing extending in a transverse direction of the vehicle body along the width of the frame unit and fixed to the frame unit rearwardly of a front end of the front wheels;
    a right and left pair of headlight units housed in the headlight housing; and
    each headlight unit producing forward directed light and leaking light directed along a direction other than the forward directed light,
    wherein light passage portions are formed in opposite end portions of the headlight housing for directing leaking light coming from each of the headlight units at least one of to the side and rearwardly toward the mower deck,
    wherein the headlight housing acts as a light guide member for guiding leaking light coming from the headlight units to the light passage portions, and
    wherein the light passage portions are openings formed in the opposite end portions of the headlight housing.

13. A ride-on mower comprising:
    front wheels and rear wheels;
    a frame unit extending in a longitudinal direction of a vehicle body and supported to the ground through the front wheels and rear wheels;
    a mower unit attached to the frame unit to be vertically movable and including at least one blade, and a mower deck covering the at least one blade from above;
    a headlight housing extending in a transverse direction of the vehicle body along the width of the frame unit and fixed to the frame unit forwardly of a front end of the mower deck; and a right and left pair of headlight units housed in the headlight housing; and each headlight unit producing forward directed light and leaking light directed along a direction other than the forward directed light, wherein light passage portions are formed in opposite end portions of the headlight housing for directing leaking light coming from each of the headlight unit at least one of to the side and rearwardly toward a direction of the front end of the mower deck, wherein the headlight housing includes a front plate having a through bore provided therein for each respective headlight unit, wherein each respective headlight unit comprises an LED array and an LED holder, wherein the LED array is structured and arranged so as to face a respective through bore, and wherein the LED holder is translucent and the leaking light passes through the translucent LED holder.

14. The ride-on mower as defined in claim 13, wherein a front surface of the LED holder contacts the front plate, and the leaking light is discharged from side surfaces of the translucent LED holder.

* * * * *